(12) United States Patent
Isojima (10) Patent No.: US 11,459,243 B2
(45) Date of Patent: Oct. 4, 2022

(54) CORE SHELL PARTICLE, METHOD OF PRODUCING CORE SHELL PARTICLE, AND FILM

(71) Applicant: FUJIFILM Corporation, Tokyo (JP)

(72) Inventor: Hiroshi Isojima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 397 days.

(21) Appl. No.: 16/731,383

(22) Filed: Dec. 31, 2019

(65) Prior Publication Data

US 2020/0140284 A1    May 7, 2020

Related U.S. Application Data

(63) Continuation of application No. PCT/JP2018/029954, filed on Aug. 9, 2018.

(30) Foreign Application Priority Data

Aug. 24, 2017    (JP) .............................. JP2017-161125

(51) Int. Cl.
*C01G 9/08* (2006.01)
*C01G 15/00* (2006.01)
(Continued)

(52) U.S. Cl.
CPC ............... *C01G 9/08* (2013.01); *C01G 15/00* (2013.01); *C09K 11/025* (2013.01); *C09K 11/0883* (2013.01); *C09K 11/56* (2013.01); *C09K 11/70* (2013.01); *C09K 11/883* (2013.01); *B82Y 20/00* (2013.01); *B82Y 40/00* (2013.01);
(Continued)

(58) Field of Classification Search
CPC ... C09K 11/70; C09K 11/883; C09K 11/0883; C01P 2004/42; C01P 2004/64; C01P 2004/84; B82Y 20/00; B82Y 40/00
See application file for complete search history.

(56) References Cited

U.S. PATENT DOCUMENTS 8,679,543 B2 * 3/2014 Bartel .................... C09K 11/70
424/489
2013/0112942 A1    5/2013 Kurtin et al.
(Continued)

FOREIGN PATENT DOCUMENTS

EP          2500396 A2    9/2012
JP       2009040633 A    2/2009
(Continued)

OTHER PUBLICATIONS

Kim et al, "Halide-Amine Co-Passivated Indium Phosphide Colloidal Quantum Dots in Tetrahedral Shape", Angew. Chem. In. Ed., 2016, 55, pp. 3714-3718, Feb. 5, 2016.*
(Continued)

*Primary Examiner* — C Melissa Koslow
(74) *Attorney, Agent, or Firm* — Studebaker & Brackett PC (57) ABSTRACT

Provided are a core shell particle including a core which contains a Group III element and a Group V element, and a shell which covers at least a part of a surface of the core and contains a Group II element and a Group VI element, in which the core shell particle has a tetrahedral shape having one side with a length of 6 nm or greater; a method of producing the core shell particle; and a film formed of the core shell particle.

18 Claims, 4 Drawing Sheets

(51) Int. Cl.
  *C09K 11/02* (2006.01)
  *C09K 11/56* (2006.01)
  *C09K 11/70* (2006.01)
  *C09K 11/88* (2006.01)
  *C09K 11/08* (2006.01)
  *B82Y 20/00* (2011.01)
  *B82Y 40/00* (2011.01)

(52) U.S. Cl.
  CPC ...... *C01P 2004/42* (2013.01); *C01P 2004/64* (2013.01); *C01P 2004/84* (2013.01); *C01P 2006/60* (2013.01)

(56) References Cited

U.S. PATENT DOCUMENTS

| | | | |
|---|---|---|---|
| 2017/0247613 A1* | 8/2017 | Ono | C09K 11/565 |
| 2018/0033856 A1* | 2/2018 | Kwon | C09K 11/70 |
| 2018/0066181 A1 | 3/2018 | Ono | |
| 2018/0066184 A1 | 3/2018 | Ono | |

FOREIGN PATENT DOCUMENTS

| | | |
|---|---|---|
| JP | 2016135845 A | 7/2016 |
| KR | 10-2014-0109377 A | 9/2014 |
| WO | 2016080435 A1 | 5/2016 |
| WO | 2016185930 A1 | 11/2016 |
| WO | 2016185932 A1 | 11/2016 |

OTHER PUBLICATIONS

An Office Action mailed by the Korean Intellectual Property Office dated Jul. 26, 2021, which corresponds to Korean Patent Application No. 10-2020-7000783 and is related to U.S. Appl. No. 16/731,383; with English language translation.

International Search Report issued in PCT/JP2018/029954; dated Sep. 11, 2018.

Written Opinion issued in PCT/JP2018/029954; dated Sep. 11, 2018.

* cited by examiner

CORE SHELL PARTICLE, METHOD OF PRODUCING CORE SHELL PARTICLE, AND FILM

CROSS-REFERENCE TO RELATED APPLICATIONS

This application is a Continuation of PCT International Application No. PCT/JP2018/029954 filed on Aug. 9, 2018, which claims priority under 35 U.S.C. § 119(a) to Japanese Patent Application No. 2017-161125 filed on Aug. 24, 2017. The above application is hereby expressly incorporated by reference, in its entirety, into the present application.

BACKGROUND OF THE INVENTION

1. Field of the Invention

The present invention relates to a core shell particle, a method of producing the same, and a film containing a core shell particle.

2. Description of the Related Art

As semiconductor fine particles which are expected to be applied to colloidal semiconductor nanoparticles (so-called quantum dots), Group II-VI semiconductor fine particles or Group III-V semiconductor fine particles have been known.

The particle size of these semiconductor fine particles is several nanometers to several tens of nanometers. In the semiconductor fine particles having such a particle size, the quantum size effect becomes significant, and the band gap energy of the semiconductor fine particles can be controlled by the particle size. In other words, in such semiconductor fine particles, the emission wavelength can be controlled by the particle size. As the particle size decreases, the band gap energy increases, and the emission wavelength can be shifted to a short wavelength side. Further, as the particle size increases, the band gap energy decreases, and the emission wavelength can be shifted to a long wavelength side.

Therefore, in order to use optical characteristics specific to the semiconductor fine particles, applications to various devices such as a piezoelectric element, an electronic device, a light-emitting element, and a laser have been researched and developed.

For example, WO2016/080435A describes, as a core shell particle which is useful as a quantum dot, a core shell particle including: a core which contains a Group III element and a Group V element; and a shell which covers at least a part of a surface of the core and contains a Group II element and a Group VI element, in which a ratio of a peak intensity of the Group II element to a peak intensity of the Group III element, which is measured by X-ray photoelectron spectroscopy, is 0.25 or greater (claim 1).

SUMMARY OF THE INVENTION

The present inventors conducted examination on the particle described in WO2016/080435A, and it was found that the luminous efficacy becomes less than 50% in some cases depending on the process (for example, the temperature increase rate during formation of a core containing a Group III element and a Group V element) of producing the core shell particles shown in Comparative Example 1 of the present specification.

Accordingly, an object of the present invention is to provide a core shell particle which has a luminous efficacy of 50% or greater and is useful as a quantum dot, a method of producing the core shell particle, and a film formed of the core shell particle.

As the result of intensive examination conducted by the present inventors in order to achieve the above-described object, it was found that a core shell particle, which includes a core containing a Group III element and a Group V element, and a shell covering at least a part of a surface of the core and containing a Group II element and a Group VI element and has a tetrahedral shape having one side with a length of 6 nm or greater, has a luminous efficacy of 50% or greater, thereby completing the present invention.

In other words, it was found that the above-described object can be achieved by employing the following configurations.

[1] A core shell particle comprising: a core which contains a Group III element and a Group V element; and a shell which covers at least a part of a surface of the core and contains a Group II element and a Group VI element, in which the core shell particle has a tetrahedral shape having one side with a length of 6 nm or greater.

[2] The core shell particle according to [1], in which an emission wavelength peak is at 640 nm or greater.

[3] The core shell particle according to [1] or [2], in which the Group III element is In, and the Group V element is any of P, N, or As.

[4] The core shell particle according to any one of [1] to [3], in which the Group III element is In, and the Group V element is P.

[5] The core shell particle according to any one of [1] to [4], in which the Group II element is Zn, and the Group VI element is S or Se.

[6] The core shell particle according to any one of [1] to [5], in which the Group II element is Zn, and the Group VI element is S.

[7] A method of producing a core shell particle, comprising: a first step of mixing a Group III raw material containing a Group III element with a Group II raw material containing a Group II element to prepare a mixed solution containing the raw materials dissolved therein; a second step of adding a Group V raw material containing a Group V element to the mixed solution to form a core containing the Group III element and the Group V element; and a third step of adding a Group VI raw material containing a Group VI element to the mixed solution after the formation of the core to form a shell containing the Group II element and the Group VI element in at least a part of a surface of the core, in which the second step is a step of forming the core by adding the Group V raw material to the mixed solution at a temperature of 130° C. or lower and increasing the temperature to a temperature range of 200° C. to 240° C. at a temperature increase rate of 0.4° C./min or less.

[8] The method of producing a core shell particle according to [7], in which the Group III element is In, and the Group V element is any of P, N, or As.

[9] The method of producing a core shell particle according to [7] or [8], in which the Group III element is In, and the Group V element is P.

[10] The method of producing a core shell particle according to any one of [7] to [9], in which the Group II element is Zn, and the Group VI element is S or Se.

[11] The method of producing a core shell particle according to any one of [7] to [10], in which the Group II element is Zn, and the Group VI element is S.

[12] The method of producing a core shell particle according to any one of [7] to [11], in which the Group III raw material is a chloride of In.

[13] The method of producing a core shell particle according to any one of [7] to [12], in which the Group II raw material is a chloride of Zn.

[14] The method of producing a core shell particle according to any one of [7] to [13], in which the Group V raw material is trisdialkylaminophosphine.

[15] The method of producing a core shell particle according to any one of [7] to [14], in which the Group VI raw material is alkylthiol.

[16] A film comprising: the core shell particle according to any one of [1] to [6].

According to the present invention, it is possible to provide a core shell particle which has a luminous efficacy of 50% or greater and is useful as a quantum dot, a method of producing the core shell particle, and a film formed of the core shell particle.

DESCRIPTION OF THE PREFERRED EMBODIMENTS

First, the mechanism for estimating the effects of the present invention will be described.

A quantum dot is capable of controlling the emission wavelength by changing the particle size, and the luminous efficacy is typically decreased in a case where the particle size is increased (Advanced Materials 24, 4180 to 4185 (2012)). The reason for this is not clear, but the present inventors considered that in a cored shell type quantum dot, an increase in size of a core having defects leads to an increase in amount of defects, and thus the characteristics of the quantum dot in a long wavelength range are degraded.

According to a method of producing a core shell particle, the temperature at the time of adding a Group V raw material to a mixed solution is 130° C. or lower in a step of forming a particle which becomes a core of the core shell particle (second step), and the temperature is increased to a temperature range of 200° C. to 240° C. from a temperature of 130° C. or lower at a temperature increase rate of 0.4° C./min or less after the addition of the Group V raw material to the mixed solution.

It is considered that a core in which the growth rate of a particle which becomes a core of a core shell particle is not extremely high and defects are reduced can be formed by employing the above-described temperature condition, and thus a core shell particle having a luminous efficacy of 50% or greater is obtained. The core shell particle obtained in the above-described manner has a tetrahedral shape with excellent crystallinity.

On the contrary, it is considered that in a case where the temperature increase rate is extremely high, the growth rate of a particle which becomes a core is extremely high so that a core having many defects is formed, and thus a core shell particle with a low luminous efficacy is obtained. The core shell particle obtained in the above-described manner has a distorted shape with low crystallinity.

In the present specification, a range expressed using "to" indicates a range including both ends described before and after "to" in the range.

Core Shell Particle

A core shell particle according to the embodiment of the present invention is a core shell particle include a core which contains a Group III element and a Group V element, and a shell which covers at least a part of a surface of the core and contains a Group II element and a Group VI element.

Further, the core shell particle according to the embodiment of the present invention has a tetrahedral shape having one side with a length of 6 nm or greater.

Figure 1:
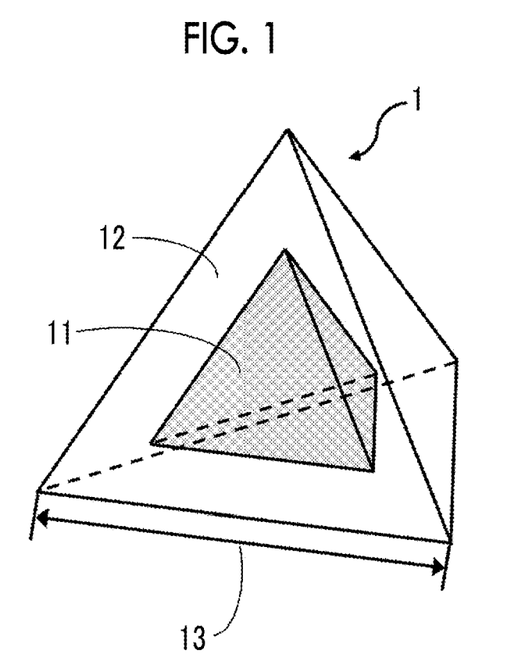
FIG. 1 is a schematic view illustrating a core shell particle in which a core and a shell each have a regular tetrahedral shape.

Hereinafter, the core shell particle according to the embodiment of the present invention will be described with reference to FIG. 1 as appropriate.

In the present invention, the shape and the size of a core shell particle 1 can be acquired by observing the core shell particle 1 using a transmission electron microscope (TEM), observing the shape, and measuring the size.

In the present invention, a length 13 of one side indicates an average value (arithmetic mean value) obtained by selecting optional 50 fine particles each having a triangular shape which is a projection of a tetrahedral shape from a TEM photograph at a magnification of 100000 and measuring the length of the maximum side of each fine particle.

Shape of Core Shell Particle

The core shell particle 1 according to the embodiment of the present invention has a tetrahedral shape and preferably a regular tetrahedral shape.

Further, the shape of the core shell particle 1 according to the embodiment of the present invention can be determined by observing the core shell particle using a transmission electron microscope (for example, HT7700 (manufactured by Hitachi High-Technologies Corporation)).

Length of One Side of Core Shell Particle

The length 13 of the core shell particle 1 having a tetrahedral shape according to the embodiment of the present invention is preferably in a range of 6 nm to 20 nm, more preferably in a range of 6 nm to 16 nm, and still more preferably in a range of 6 nm to 14 nm.

Further, the length 13 of one side of the core shell particle 1 having a tetrahedral shape according to the embodiment of the present invention can be acquired using the above-described method.

Emission Wavelength Peak of Core Shell Particle

The emission wavelength peak of the core shell particle 1 according to the embodiment of the present invention is not particularly limited, but is preferably at 640 nm or greater, more preferably at 640 nm to 780 nm, and still more preferably at 640 to 750 nm.

Further, the emission wavelength peak of the core shell particle 1 according to the embodiment of the present invention can be acquired from the maximum value of the emission spectrum at the time of irradiation with excitation light having a wavelength of 450 nm using a quantum yield measuring device (for example, C11347-01 (manufactured by Hamamatsu Photonics K. K.)).

Core

A core 11 contained in the core shell particle 1 according to the embodiment of the present invention is a so-called Group III-V semiconductor which contains a Group III element and a Group V element.

Group III Element

Specific examples of the Group III element include indium (In), aluminum (Al), and gallium (Ga).

As the Group III element constituting the core 11 in the core shell particle 1 according to the embodiment of the present invention, at least one selected from the group consisting of In, Al, and Ga is preferable, one selected from the group consisting of In, Al, and Ga is more preferable, and In is still more preferable.

Group V Element

Specific examples of the Group V element include phosphorus (P), nitrogen (N), and arsenic (As).

As the Group V element constituting the core 11 in the core shell particle 1 according to the embodiment of the present invention, any of P, N, or As is preferable, and P is more preferable.

Group III-V Semiconductor

In the present invention, a Group III-V semiconductor obtained by appropriately combining the Group III element and the Group V element exemplified above can be used as the core 11.

As the Group III-V semiconductor constituting the core 11 in the core shell particle 1 according to the embodiment of the present invention, InP, InN, or InAs is preferable, and InP is more preferable from the viewpoints of further increasing the luminous efficacy and easily obtaining an excellent half-width of light emission.

Shell

A shell 12 contained in the core shell particle 1 according to the embodiment of the present invention is a material that covers at least a part of the surface of the core 11 and is a so-called Group II-VI semiconductor that contains a Group II element and a Group VI element.

Here, in the present invention, it is possible to confirm whether at least a part of the surface of the core 11 is covered with the shell 12 based on composition distribution analysis according to energy dispersive X-ray spectroscopy (TEM-EDX) using a transmission electron microscope.

Group II Element

Specific examples of the Group II element include zinc (Zn), cadmium (Cd), and magnesium (Mg).

As the Group II element constituting the shell 12 in the core shell particle 1 according to the embodiment of the present invention, at least one selected from the group consisting of Zn, Cd, and Mg is preferable, one selected from the group consisting of Zn, Cd, and Mg is more preferable, and Zn is still more preferable.

Group VI Element

Further, specific examples of the Group VI element include sulfur (S), oxygen (O), selenium (Se), and tellurium (Te).

As the Group VI element constituting the shell 12 in the core shell particle 1 according to the embodiment of the present invention, at least one selected from the group consisting of S and Se is preferable, S or Se is more preferable, and S is still more preferable.

Group II-VI Semiconductor

In the present invention, a Group II-VI semiconductor obtained by appropriately combining the Group II element and the Group VI element described above can be used as the shell 12.

A crystal system which is the same as or similar to the core 11 described above is preferable as such a Group II-VI semiconductor.

As the Group II-VI semiconductor constituting the shell 12 in the core shell particle 1 according to the embodiment of the present invention, ZnS or ZnSe is preferable, and ZnS is more preferable from the viewpoint of the safety and the like.

Coordination Molecule

The core shell particle 1 according to the embodiment of the present invention may have coordination molecules on the surface thereof. In a case where the core shell particle has coordination molecules on the surface thereof, the dispersibility is imparted to the core shell particle 1 according to the embodiment of the present invention, and the surface defects are reduced.

From the viewpoint of the dispersibility or the like in a non-polar solvent, it is preferable that the coordination molecule contains aliphatic hydrocarbon.

Further, from the viewpoint of improving the dispersibility, it is preferable that the coordination molecule is a ligand having at least 6 or more carbon atoms in the main chain and more preferable that the coordination molecule is a ligand having 10 or more carbon atoms in the main chain.

Such a coordination molecule may be a saturated compound or an unsaturated compound, and specific examples thereof include decanoic acid, lauric acid, myristic acid, palmitic acid, stearic acid, behenic acid, oleic acid, erucic acid, oleylamine, dodecylamine, dodecanethiol, 1,2-hexadecanethiol, trioctylphosphine oxide, and cetrimonium bromide. These may be used alone or in combination of two or more kinds thereof.

Among these, from the viewpoint that generation of a Group III-V semiconductor is not inhibited, formation of an oxide is suppressed, and excellent semiconductor crystals are obtained even in a case where a Group V raw material with a low reactivity (such as trisdialkylaminophosphine) is used, it is desirable to use an amine-based compound such as oleylamine or dodecylamine which does not have an oxygen atom.

Method of Producing Core Shell Particles

A method of producing the core shell particle 1 according to the embodiment of the present invention (hereinafter, also referred to as a "production method according to the embodiment of the present invention") is a method of producing a core shell particle, including a first step of mixing a Group III raw material containing a Group III element with a Group II raw material containing a Group II element to prepare a mixed solution containing the raw materials dissolved therein, a second step of adding a Group V raw material containing a Group V element to the mixed solution to form the core 11 containing the Group III element and the Group V element, and a third step of adding a Group VI raw material containing a Group VI element to the mixed solution after the formation of the core 11 to form the shell 12 containing the Group II element and the Group VI element in at least a part of the surface of the core 11, in which the second step is a step of forming the core by adding the Group V raw material to the mixed solution at a temperature of 130° C. or lower and increasing the temperature to a temperature range of 200° C. to 240° C. at a temperature increase rate of 0.4° C./min or less.

Hereinafter, the method of producing the core shell particle according to the embodiment of the present invention will be described with reference to FIG. 1 as appropriate.

Group II Element, Group III Element, Group V Element, and Group VI Element

Here, examples of the Group II element, the Group III element, the Group V element, and the Group VI element are the same as those described in the section of the core shell particle 1 according to the embodiment of the present invention described above.

First Step, Second Step, and Third Step

Hereinafter, raw materials and conditions of each treatment step will be described in detail.

First Step

The first step is a step of mixing a Group III raw material containing a Group III element with a Group II raw material containing a Group II element to prepare a mixed solution containing the raw materials dissolved therein.

In the production method according to the embodiment of the present invention, from the viewpoint of forming the above-described coordination molecules on the surface of the core shell particle 1 to be obtained, in the first step, an aspect in which the Group III raw material and the Group II raw material are added to a solution containing the above-described coordination molecules so as to be dissolved therein is preferable.

Group III Raw Material

Specific examples of the Group III raw material containing a Group III element include indium chloride, indium oxide, indium nitrate, indium sulfate, and indium acid; aluminum phosphate, aluminum acetylacetonate, aluminum chloride, aluminum fluoride, aluminum oxide, aluminum nitrate, aluminum sulfate; and gallium acetylacetonate, and gallium chloride, gallium fluoride, gallium oxide, gallium nitrate, and gallium sulfate.

Among these, from the viewpoint that excellent semiconductor crystals (cores) are obtained even in a case where a Group V raw material with a low reactivity (such as trisdialkylaminophosphine) is used and oxidation is unlikely to occur, it is preferable to use indium chloride which is a chloride of In.

Group II Raw Material

Specific examples of the Group II raw material containing a Group II element include dimethyl zinc, diethyl zinc, zinc carboxylate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc acetate, and zinc sulfate.

Among these, from the viewpoints that oxidation is unlikely to occur and the compatibility with optical coordination molecules described below and the solubility in a non-polar solvent are relatively high, it is preferable to use zinc chloride which is a chloride of Zn.

Coordination Molecules

In a case where the above-described coordination molecules are used together with the Group III raw material and the Group II raw material described above in the first step, it is desirable to use an amine-based compound such as oleylamine or dodecylamine which does not have an oxygen atom as described above.

Non-Polar Solvent

In the production method according to the embodiment of the present invention, it is preferable to use a non-polar solvent together with the Group III raw material, the Group II raw material, and optional coordination molecules in the first step.

Specific examples of the non-polar solvent include aliphatic saturated hydrocarbon such as n-decane, n-dodecane, n-hexanedecane, or n-octadecane; aliphatic unsaturated hydrocarbon such as 1-undecene, 1-dodecene, 1-hexadecene, or 1-octadecene; and trioctylphosphine.

Among these, aliphatic unsaturated hydrocarbon having 12 or greater carbon atoms is preferable and 1-octadecene is more preferable.

Dissolution Conditions

In the first step, the method is not particularly limited to the method of dissolving the Group III raw material, the Group II raw material, optional coordination molecules, and the like, a method of heating the solution at a temperature of 80° C. to 180° C. so that the raw materials and the coordination molecules are dissolved therein is preferable. At this time, it is preferable that dissolved oxygen or moisture is removed from the mixed solution by heating the solution under reduced pressure.

Further, the time required for heating and dissolving the raw materials is preferably 30 minutes or longer.

Second Step

The second step is a step of adding a Group V raw material containing a Group V element to the mixed solution prepared in the first step to form the core 11 containing the Group III element and the Group V element.

Here, in the production method according to the embodiment of the present invention, since the addition of the Group II raw material is carried out in the first step, the Group II raw material which is a raw material of the shell 12 is present during the formation of the core 11 in the second step. However, the Group II raw material is unlikely to be used to form the core 11, and thus most of the Group II raw material is considered to be present on the surface of the formed core 11.

As described above, since the Group II raw material serving as a material of the shell 12 is present during the formation of the core 11, the luminous efficacy of the core shell particle 1 to be obtained is further increased. The reason for this is considered that since the Group VI raw material is added in the third step so that the Group II raw material and the Group VI raw material, which are present on the surface of the core 11 in advance, react with each other during the formation of the shell 12, a uniform coating is formed and the interface between the core 11 and the shell 12 is slightly delocalized (in a solid solution state).

Group V Raw Material

Specific examples of the Group V raw material containing a Group V element include tristrialkylsilyl phosphine, trisdialkylsilyl phosphine, and trisdialkylaminophosphine; arsenic oxide, arsenic chloride, arsenic sulfate, arsenic bromide, and arsenic iodide; and nitrogen monoxide, nitric acid, and ammonium nitrate. Among these, it is preferable to use tristrialkylsilyl phosphine or trisdialkylaminophosphine and more preferable to use trisdialkylaminophosphine from the viewpoints of the safety and the cost. Specifically, it is still more preferable to use trisdimethylaminophosphine.

Heating Conditions

From the viewpoint of suppressing nucleation during the addition of the raw material, the temperature for adding the Group V raw material (hereinafter, also referred to as the temperature during the addition) to the mixed solution prepared in the first step is 130° C. or lower.

The temperature during the addition is not particularly limited as long as the temperature is 130° C. or lower, but is preferably in a range of 80° C. to 130° C. and more preferably in a range of 100° C. to 130° C. from the viewpoint of further suppressing deposition of the raw material. For example, in a case where trisdimethylaminophosphine is used as the Group V raw material, it is preferable that the temperature during the addition is set to be in a range of 100° C. to 130° C.

The particle (hereinafter, also referred to as the "core particle") which becomes the core 11 in the core shell particle 1 according to the embodiment of the present invention is formed by adding the Group V raw material to the mixed solution prepared in the first step and increasing the temperature.

The core particle is formed by increasing the temperature to a temperature range of 200° C. to 240° C. at a temperature increase rate of 0.4° C./min or less (hereinafter, the temperature to reach after the temperature increase will be referred to as the "reaching temperature").

The reaching temperature is not particularly limited as long as the temperature is in temperature range of 200° C. to 240° C., but is preferably in a temperature range of 210° C. to 235° C. and more preferably in a temperature range of 215° C. to 230° C. from the viewpoints of suppressing the influence of Ostwald ripening and making the size of the core particles uniform. The temperature increase rate is not particularly limited as long as the rate is 0.4° C./min or less, but is preferably in a range of 0.15° C./min to 0.4° C./min. In a case where the temperature increase rate is greater than 0.4° C./min, since the growth of the core particle becomes faster, the amount of defects is increased. Therefore, a core particle with excellent crystallinity cannot be obtained. Further, in a case where the temperature increase rate is 0.15° C./min or greater, the growth of the core particle is promoted so that the particle size is easily increased.

Here, the temperature increased after the addition of the Group V raw material to the mixed solution prepared in the first step may reach the reaching temperature within the temperature range and may be temporarily lowered in the middle of the temperature increase, and the instantaneous temperature increase rate during the temperature increase is constantly within the above-described range.

By employing the above-described temperature conditions, the particle which is formed in the second step and becomes the core 11 in the core shell particle 1 according to the embodiment of the present invention has a tetrahedral shape with few defects and excellent crystallinity. Further, the time for increasing the temperature to the above-described temperature range after the addition of the Group V raw material to the mixed solution prepared in the first step can be appropriately adjusted by the temperature increase rate and the reaching temperature.

Third Step

The third step is a step of adding a Group VI raw material containing a Group VI element to the mixed solution after the formation of the core 11 in the second step to form the shell 12 containing the Group II element and the Group VI element in at least a part of the surface of the core 11.

Group VI Raw Material

Specific examples of the Group VI raw material containing a Group VI element include sulfur, alkylthiol, trialkylphosphine sulphide, trialkenylphosphine sulphide, alkylamino sulphide, alkenylamino sulphide, cyclohexyl isothiocyanate, and diethyl dithiocarbamic acid; and trialkylphosphine selenium, trialkenylphosphine selenium, alkylamino selenium, alkenylamino selenium, trialkylphosphine telluride, trialkenylphosphine telluride, alkylamino telluride, and alkenylamino telluride.

Among these, from the viewpoint of excellent dispersibility of core shell particles to be obtained, it is preferable to use alkylthiol, specifically, more preferable to use dodecanethiol and/or octanethiol, and still more preferable to use dodecanethiol.

Heating Conditions

The lower limit of the heating temperature in the third step is not particularly limited, but is preferably 230° C. or higher, more preferably 235° C. or higher, and still more preferably 240° C. or higher from the viewpoint that alloying of the Group III element (for example, In) and the Group V element (for example, P) contained in the core and the Group II element (for example, Zn) contained in the shell appropriately proceeds.

Further, the upper limit of the heating temperature in the third step is not particularly limited, but is preferably 295° C. or lower and more preferably 290° C. or lower from the viewpoint of suppressing generation of a non-dispersible precipitate due to decomposition or the like in a case where the core shell particle contains the above-described coordination molecules.

In consideration of the upper limit and the lower limit of the temperature described above, the heating temperature in the third step is preferably in a temperature range of 230° C. to 295° C., more preferably in a temperature range of 230° C. to 290° C., and still more preferably in a temperature range of 240° C. to 290° C.

Further, the heating time in the third step is not particularly limited, but is preferably 1 hour or longer and more preferably 7 hours or longer from the viewpoint of further improving the luminous efficacy.

Additional Addition Step

The production method according to the embodiment of the present invention may include an additional addition step of adding a Group V raw material containing a Group V element to the mixed solution after the formation of the core 11 in the second step so that the formed core 11 is allowed to further grow after the second step and before the third step.

The additional addition step may be carried out two or more times. In the second or subsequent n-th additional addition step (n represents an integer of 2 or greater), the "mixed solution after the formation of the core in the second step" becomes the "mixed solution after further growth of the core in the (n−1)-th additional addition step". Further, in the third step after the additional addition step, the "mixed solution after the formation of the core in the second step" becomes the "mixed solution after further growth of the core in the additional addition step".

Group V Raw Material

The description of the Group V raw material is the same as the description of the Group V raw material in the second step. A Group V raw material which is different from the Group V raw material in the second step may be used, but it is preferable that the same Group V raw material is used.

Heating Conditions

In the temperature during the addition of the Group V raw material to the mixed solution after the formation of the core 11 in the second step in the first additional addition step and in the n-th additional addition step (n represents an integer of 2 or greater), the temperature during the addition of the Group V raw material to the mixed solution after further growth of the core 11 in the (n−1)-th additional addition step is the same as described in the section of the heating conditions for the second step.

Further, in the additional addition step, the temperature may be temporarily lowered to a temperature lower than 130° C., for example, room temperature before the addition of the Group V raw material and may be increased to a temperature of 130° C. or lower during the addition of the Group V raw material.

Film

The film according to the embodiment of the present invention is a film containing the core shell particle according to the embodiment of the present invention described above.

Since such a film according to the embodiment of the present invention has high luminous efficacy and is useful as quantum dots, the film can be applied to a wavelength conversion film used for a display, a photoelectric conversion (or wavelength conversion) film of a solar cell, a biological label, a thin film transistor, and the like.

Further, the film material as a base material constituting the film according to the embodiment of the present invention is not particularly limited and may be a resin or a thin glass film.

Specific examples thereof include resin materials mainly formed of an ionomer, polyethylene, polyvinyl chloride, polyvinylidene chloride, polyvinyl alcohol, polypropylene, polyester, polycarbonate, polystyrene, polyacrylonitrile, an ethylene vinyl acetate copolymer, an ethylene-vinyl alcohol copolymer, an ethylene-methacrylic acid copolymer film, and nylon.

EXAMPLES

Hereinafter, the present invention will be described in more detail based on examples. The materials, the use amounts, the ratios, the treatment contents, and the treatment procedures described in the following examples can be changed as appropriate within the range not departing from the gist of the present invention. Therefore, the scope of the present invention should not be limitatively interpreted by the following examples.

Example 1

First Step 40 mL of oleylamine serving as coordination molecules, 1.20 g (5.4 mmol) of indium chloride serving as a Group III raw material, and 1.47 g (8.3 mmol) of zinc chloride serving as a Group II raw material were added to a flask, and the solution was heated and stirred at 100° under reduced pressure to dissolve the raw materials and degassed for 50 minutes.

Second Step

Next, the flask was heated to 180° C. in a nitrogen flow, and the state was maintained for 50 minutes. Thereafter, the temperature of the solution was lowered to 130° C., 1.5 mL (8.27 mmol) of trisdimethylaminophosphine serving as a Group V raw material was added thereto, the temperature was increased to 220° C. for 4 hours (temperature increase rate: 0.375° C./min), and the solution was heated at 220° C. for 25 minutes after the temperature increase.

Third Step

Next, 17.96 mL of dodecanethiol serving as a Group VI raw material was added to the solution containing cores in a state of being heated at 220° C., and the solution was heated at 240° C. for 7 hours.

Next, the obtained solution was cooled to room temperature, ethanol was added thereto, and centrifugation was performed to precipitate the particles.

The supernatant was disposed of, and the resultant was allowed to be dispersed in a toluene solvent to prepare a toluene solution in which nanoparticles (InP/ZnS) having In and P as cores and Zn and S as shells were dispersed.

The temperature increase rate at the time of the temperature increase to 220° C. after the addition of the Group V raw material in the second step (the columns of the "temperature increase rate in second step (° C./min)"), the shape of the produced core shell particle observed according to the above-described method (the columns of the "shape"), the length of one side measured according to the above-described method (the columns of the "length of one side (nm)"), the peak wavelength of the emission spectrum measured according to the above-described method (the columns of the "emission wavelength peak (nm)"), and the luminous efficacy measured according to a method described below (the columns of the "luminous efficacy (%)") are respectively listed in Table 1.

Example 2

Next, in the second step, the flask was heated to 180° C. in a nitrogen flow, and the state was maintained for 50 minutes. Thereafter, a toluene solution in which nanoparticles (InP/ZnS) having In and P as cores and Zn and S as shells were dispersed was prepared in the same manner as in Example 1 except that the temperature of the solution was lowered to 130° C., 1.5 mL (8.27 mmol) of trisdimethylaminophosphine serving as a Group V raw material was added thereto, the temperature was increased to 220° C. for 10 hours (temperature increase rate: 0.15° C./min), and the solution was heated at 220° C. for 25 minutes after the temperature increase.

The temperature increase rate at the time of the temperature increase to 220° C. after the addition of the Group V raw material in the second step (the columns of the "temperature increase rate in second step (° C./min)"), the shape of the produced core shell particle observed according to the above-described method (the columns of the "shape"), the length of one side measured according to the above-described method (the columns of the "length of one side (nm)"), the peak wavelength of the emission spectrum measured according to the above-described method (the columns of the "emission wavelength peak (nm)"), and the luminous efficacy measured according to a method described below (the columns of the "luminous efficacy (%)") are respectively listed in Table 1.

Comparative Example 1

Step of Preparing Mixed Solution 40 mL of oleylamine serving as coordination molecules, 1.20 g (5.4 mmol) of indium chloride serving as a Group III raw material, and 1.47 g (8.3 mmol) of zinc chloride serving as a Group II raw material were added to a flask, and the solution was heated and stirred at 100° under reduced pressure to dissolve the raw materials and degassed for 50 minutes.

Step of Forming Core

Next, the flask was heated to 180° C. in a nitrogen flow, the state was maintained for 50 minutes, 1.5 mL (8.27 mmol) of trisdimethylaminophosphine serving as a Group V raw material was added thereto, the temperature was increased to 220° C. for 5 minutes (temperature increase rate: 18° C./min), and the solution was heated at 220° C. for 25 minutes after the temperature increase.

Step of Forming Shell

Next, 17.96 mL of dodecanethiol serving as a Group VI raw material was added to the solution containing cores in a state of being heated at 220° C., and the solution was heated at 240° C. for 7 hours.

Next, the obtained solution was cooled to room temperature, ethanol was added thereto, and centrifugation was performed to precipitate the particles.

The supernatant was disposed of, and the resultant was allowed to be dispersed in a toluene solvent to prepare a toluene solution in which nanoparticles (InP/ZnS) having In and P as cores and Zn and S as shells were dispersed.

The temperature increase rate at the time of the temperature increase to 220° C. after the addition of the Group V raw material in the step of forming the core (the columns of the "temperature increase rate (° C./min)"), the shape of the produced core shell particle observed according to the above-described method (the columns of the "shape"), the peak wavelength of the emission spectrum measured according to the above-described method (the columns of the "emission wavelength peak (nm)"), and the luminous efficacy measured according to a method described below (the columns of the "luminous efficacy (%)") are respectively listed in Table 1.

Example 3

A toluene solution in which nanoparticles (InP/ZnS) having In and P as cores and Zn and S as shells were dispersed was prepared in the same manner as in Example 1 except that the "additional addition step" described below was performed once after the second step and before the third step.

Additional Addition Step

After the temperature of the solution was lowered to room temperature, the temperature was increased to 130° C., 1.0 mL (5.51 mmol) of trisdimethylaminophosphine serving as a Group V raw material was added thereto, the temperature was increased to 220° C. for 4 hours (temperature increase rate: 0.375° C./min), and the solution was heated at 220° C. for 25 minutes after the temperature increase.

The temperature increase rate at the time of the temperature increase to 220° C. after the addition of the Group V raw material in the second step (the columns of the "temperature increase rate in second step (° C./min)"), the number of times of repeating the additional addition step (the columns of the "number of times of performing additional addition step"), the temperature increase rate at the time of the temperature increase to 220° C. after the addition of the Group V raw material in the additional addition step (the columns of the "temperature increase rate in additional addition step (° C./min)"), the shape of the produced core shell particle observed according to the above-described method (the columns of the "shape"), the length of one side measured according to the above-described method (the columns of the "length of one side (nm)"), the peak wavelength of the emission spectrum measured according to the above-described method (the columns of the "emission wavelength peak (nm)"), and the luminous efficacy measured according to a method described below (the columns of the "luminous efficacy (%)") are respectively listed in Table 1.

Example 4

A toluene solution in which nanoparticles (InP/ZnS) having In and P as cores and Zn and S as shells were dispersed was prepared in the same manner as in Example 3 except that the additional addition step was repeatedly performed two times after the second step, and the third step was performed.

The temperature increase rate at the time of the temperature increase to 220° C. after the addition of the Group V raw material in the second step (the columns of the "temperature increase rate in second step (° C./min)"), the number of times of repeating the additional addition step (the columns of the "number of times of performing additional addition step"), the temperature increase rate at the time of the temperature increase to 220° C. after the addition of the Group V raw material in the additional addition step (the columns of the "temperature increase rate in additional addition step (° C./min)"), the shape of the produced core shell particle observed according to the above-described method (the columns of the "shape"), the length of one side measured according to the above-described method (the columns of the "length of one side (nm)"), the peak wavelength of the emission spectrum measured according to the above-described method (the columns of the "emission wavelength peak (nm)"), and the luminous efficacy measured according to a method described below (the columns of the "luminous efficacy (%)") are respectively listed in Table 1.

Example 5

A toluene solution in which nanoparticles (InP/ZnS) having In and P as cores and Zn and S as shells were dispersed was prepared in the same manner as in Example 3 except that the additional addition step was repeatedly performed three times after the second step, and the third step was performed.

The temperature increase rate at the time of the temperature increase to 220° C. after the addition of the Group V raw material in the second step (the columns of the "temperature increase rate in second step (° C./min)"), the number of times of repeating the additional addition step (the columns of the "number of times of performing additional addition step"), the temperature increase rate at the time of the temperature increase to 220° C. after the addition of the Group V raw material in the additional addition step (the columns of the "temperature increase rate in additional addition step (° C./min)"), the shape of the produced core shell particle observed according to the above-described method (the columns of the "shape"), the length of one side measured according to the above-described method (the columns of the "length of one side (nm)"), the peak wavelength of the emission spectrum measured according to the above-described method (the columns of the "emission wavelength peak (nm)"), and the luminous efficacy measured according to a method described below (the columns of the "luminous efficacy (%)") are respectively listed in Table 1.

Comparative Example 2

A toluene solution in which nanoparticles (InP/ZnS) having In and P as cores and Zn and S as shells were dispersed was prepared in the same manner as in Comparative Example 1 except that the "step of allowing the core to grow" described below was performed once after the step of forming the core and before the step of forming the shell.

Step of Allowing Core to Grow

After the temperature of the solution was lowered to room temperature, the temperature was increased to 130° C., 1.0 mL (5.5 mmol) of trisdimethylaminophosphine serving as a Group V raw material was added thereto, the temperature was increased to 220° C. for 5 minutes (temperature increase rate: 18° C./min), and the solution was heated at 220° C. for 25 minutes after the temperature increase.

The temperature increase rate at the time of the temperature increase to 220° C. after the addition of the Group V raw material in the step of forming the core (the columns of the "temperature increase rate in second step (° C./min)"), the number of times of repeating the step of allowing the core to grow (the columns of the "number of times of performing additional addition step"), the temperature increase rate at the time of the temperature increase to 220° C. after the addition of the Group V raw material in the step of allowing the core to grow (the columns of the "temperature increase rate in additional addition step (° C./min)"), the shape of the produced core shell particle observed according to the above-described method (the columns of the "shape"), the peak wavelength of the emission spectrum measured according to the above-described method (the columns of the "emission wavelength peak (nm)"), and the luminous efficacy measured according to a method described below (the columns of the "luminous efficacy (%)") are respectively listed in Table 1.

Method of Measuring Luminous Efficacy of Core Shell Particle

The luminous efficacy was measured by adjusting the concentration of the obtained dispersion liquid containing the core shell particles such that the absorbance at an excitation wavelength of 450 nm was set to 0.02 using an absolute PL quantum yield measuring device C11347-01 (manufactured by Hamamatsu Photonics K.K.)

Further, the luminous efficacy in Table 1 was calculated as a ratio of the number of emission photons to the number of absorption photons.

TABLE 1

| | | Method of producing core shell particle | | | Core shell particle | | | |
| | | Temperature increase rate in second step (° C./min) | Number of times of performing additional addition step (times) | Temperature increase rate in additional addition step (° C./min) | Shape | Length of one side (nm) | Emission wavelength peak (nm) | Luminous efficacy (%) |
|---|---|---|---|---|---|---|---|---|
| Example | 1 | 0.375 | 0 | — | Tetrahedron | 6.6 | 598 | 65 |
| | 2 | 0.15 | 0 | — | Tetrahedron | 6.2 | 569 | 68 |
| Comparative Example | 1 | 18 | 0 | — | Amorphous | — | 620 | 33 |

TABLE 1-continued

| | | Method of producing core shell particle | | | Core shell particle | | |
|---|---|---|---|---|---|---|---|
| | | Temperature increase rate in second step (° C./min) | Number of times of performing additional addition step (times) | Temperature increase rate in additional addition step (° C./min) | Shape | Length of one side (nm) | Emission wavelength peak (nm) | Luminous efficacy (%) |
| Example | 3 | 0.375 | 1 | 0.375 | Tetrahedron | 7.3 | 640 | 69 |
| | 4 | 0.375 | 2 | 0.375 | Tetrahedron | 7.8 | 660 | 70 |
| | 5 | 0.375 | 3 | 0.375 | Tetrahedron | 8.7 | 718 | 67 |
| Comparative Example | 2 | 18 | 1 | 18 | Amorphous | — | 635 | 35 |

Description Of Results

As shown in Examples 1 to 5 listed in Table 1, the core shell particle which had a luminous efficacy of 50% or greater and was useful as a quantum dot was able to be produced by adding the Group V raw material at 130° C. and increasing the temperature to 220° C. at a temperature increase rate of 0.4° C./min or less in the second step during the production of the core shell particle. Further, the core shell particle produced in the above-described manner had a tetrahedral shape having one side with a length of 6 nm or greater.

Further, as shown in Examples 3 to 5 listed in Table 1, the size of the core shell particle was able to be increased by performing the additional addition step once or more times, and the emission of light in a long wavelength range was able to be realized while a luminous efficacy of 50% or greater was maintained. It was assumed that the amount of defects in the core was reduced by adjusting the growth rate of the core so as not to be extremely high in the second step and the additional addition step.

Meanwhile, as shown in Comparative Example 1 and Comparative Example 2 listed in Table 1, in a case where the temperature increase rate during the formation and growth of the core was greater than 0.4° C./min, the luminous efficacy of the core shell particle to be finally obtained was greatly degraded compared to the examples. The degradation was considered to be caused by the large amount of defects in the core.

The transmission electron microscopy images of the core shell particle of Comparative Example 1, the core (before the formation of the shell) in the core shell particle and the core shell particle of Example 1, and the core (before the formation of the shell) in the core shell particle and the core shell particle of Example 5 are respectively shown in FIGS. 2 to 6.

Figure 2:
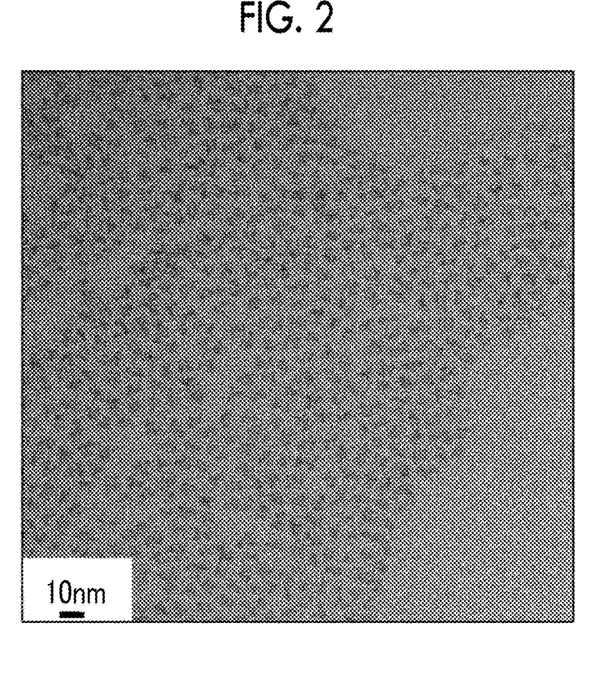
FIG. 2 is a transmission electron microscopy image of core shell particles produced in Comparative Example 1.
Figure 3:
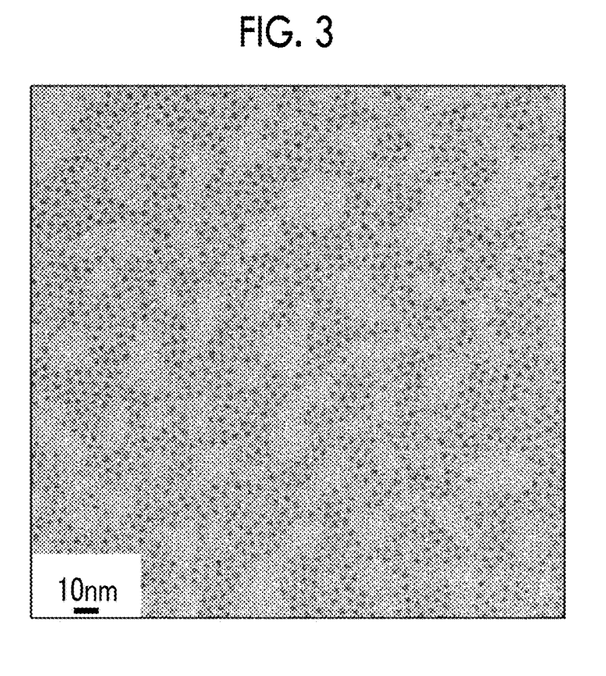
FIG. 3 a transmission electron microscopy image of core particles produced in Example 1.
Figure 4:
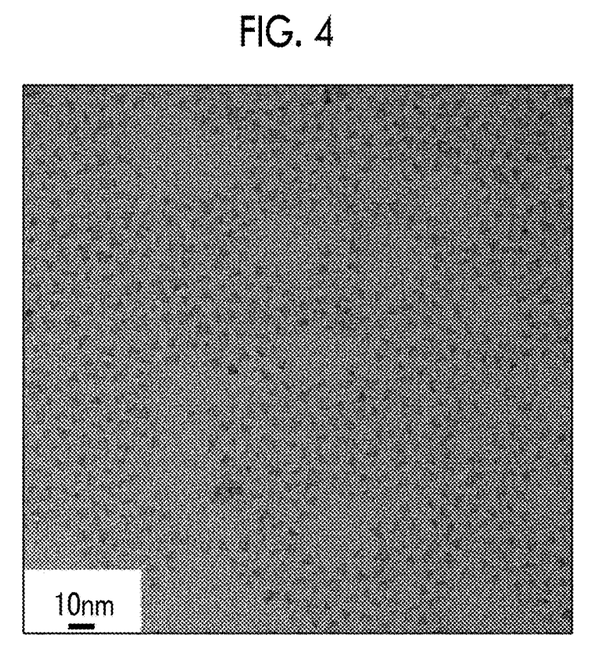
FIG. 4 a transmission electron microscopy image of core shell particles produced in Example 1.
Figure 5:
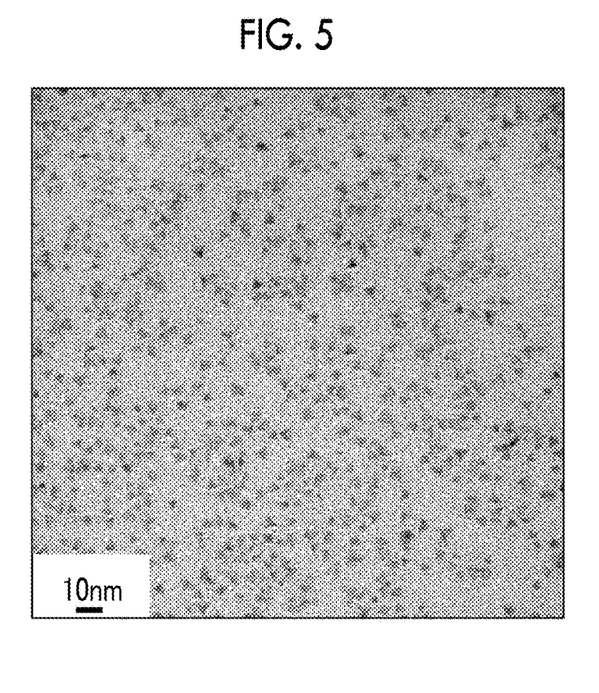
FIG. 5 a transmission electron microscopy image of core particles produced in Example 5.
Figure 6:
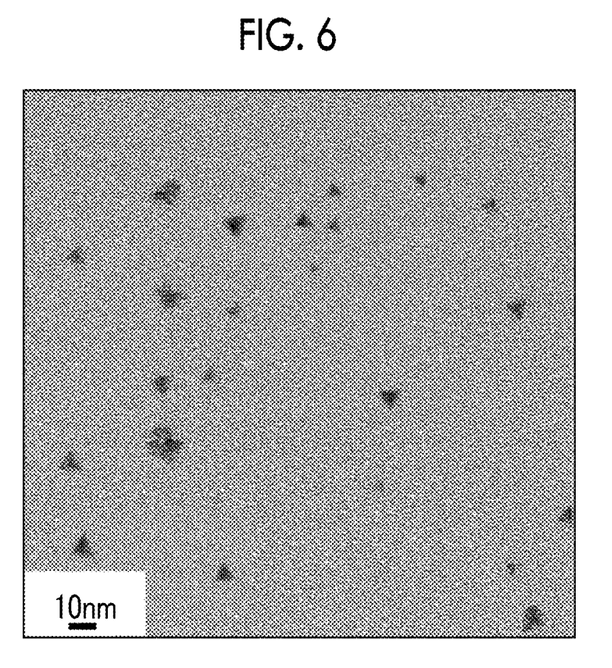
FIG. 6 a transmission electron microscopy image of core shell particles produced in Example 5.

The core shell particles of Example 1 and Example 5 both had a tetrahedral shape (FIGS. 4 and 6), but the core shell particle of Comparative Example 1 had an amorphous shape (FIG. 2). Further, the cores in the core shell particles of Example 1 and Example 5 both had a tetrahedral shape (FIGS. 2 and 4).

EXPLANATION OF REFERENCES

1: core shell particle
11: core
12: shell
13: length of one side

What is claimed is:

1. A core shell particle comprising:
    a core which contains a Group III element and a Group V element; and
    a shell which covers at least a part of a surface of the core and contains a Group II element and a Group VI element,
    wherein the core shell particle has a tetrahedral shape having one side with a length of 6 nm or greater,
    wherein an emission wavelength peak of the core shell particle is at 640 nm or greater, and
    wherein the core shell particle has a luminous efficacy of 50% or greater.

2. The core shell particle according to claim 1,
    wherein the Group III element is In, and
    the Group V element is any of P, N, or As.

3. The core shell particle according to claim 1,
    wherein the Group III element is In, and
    the Group V element is P.

4. The core shell particle according to claim 1,
    wherein the Group II element is Zn, and
    the Group VI element is S or Se.

5. The core shell particle according to claim 1,
    wherein the Group II element is Zn, and
    the Group VI element is S.

6. A method of producing a core shell particle, comprising:
    a first step of mixing a Group III raw material containing a Group III element with a Group II raw material containing a Group II element to prepare a mixed solution containing the raw materials dissolved therein;
    a second step of adding a Group V raw material containing a Group V element to the mixed solution to form a core containing the Group III element and the Group V element; and
    a third step of adding a Group VI raw material containing a Group VI element to the mixed solution after the formation of the core to form a shell containing the Group II element and the Group VI element in at least a part of a surface of the core,
    wherein the second step is a step of forming the core by adding the Group V raw material to the mixed solution at a temperature of 130° C. or lower and increasing the temperature to a temperature range of 200° C. to 240° C. at a temperature increase rate of 0.4° C./min or less.

7. The method of producing a core shell particle according to claim 6,
    wherein the Group III element is In, and
    the Group V element is any of P, N, or As.

8. The method of producing a core shell particle according to claim 6,
wherein the Group III element is In, and
the Group V element is P.

9. The method of producing a core shell particle according to claim 6,
wherein the Group II element is Zn, and
the Group VI element is S or Se.

10. The method of producing a core shell particle according to claim 6,
wherein the Group II element is Zn, and
the Group VI element is S.

11. The method of producing a core shell particle according to claim 6,
wherein the Group III raw material is a chloride of In.

12. The method of producing a core shell particle according to claim 6,
wherein the Group II raw material is a chloride of Zn.

13. The method of producing a core shell particle according to claim 6,
wherein the Group V raw material is trisdialkylaminophosphine.

14. The method of producing a core shell particle according to claim 6,
wherein the Group VI raw material is alkylthiol.

15. A film comprising:
the core shell particle according to claim 1.

16. A film comprising:
the core shell particle according to claim 3.

17. A film comprising:
the core shell particle according to claim 4.

18. A film comprising:
the core shell particle according to claim 5.

* * * * *